Jan. 18, 1966  G. J. P. GUEUGNIER  3,230,336
METHOD AND APPARATUS FOR THE CONTINUOUS MANUFACTURE
OF WELDED METAL TUBES
Filed June 4, 1963
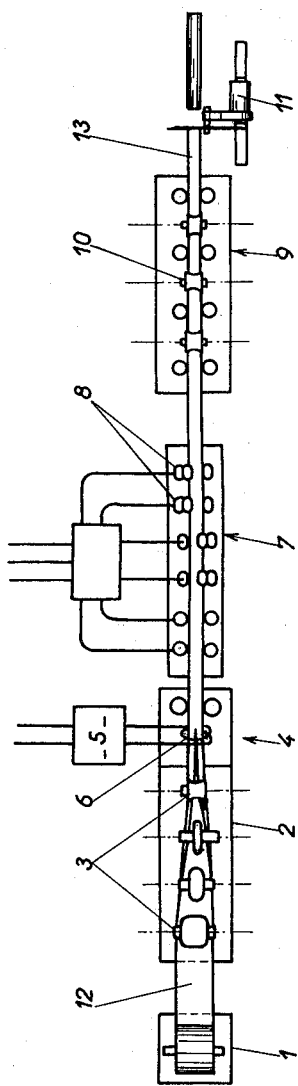
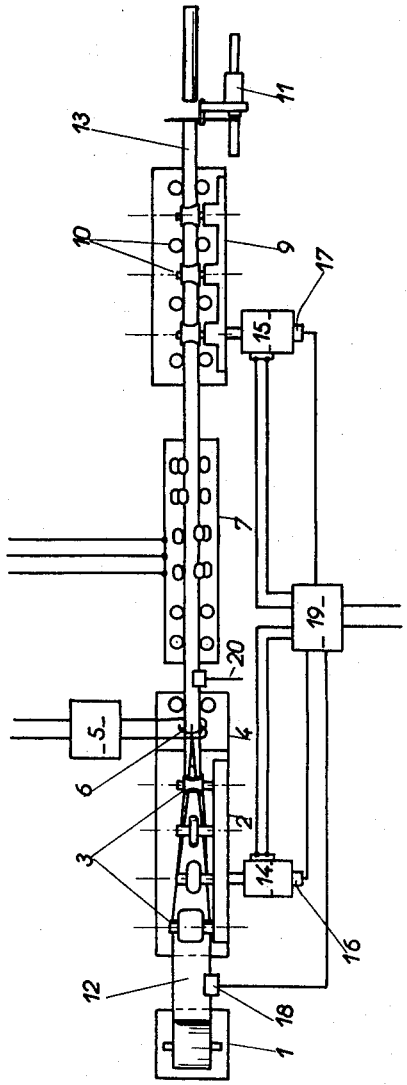
INVENTOR
GUY JEAN PIERRE GUEUGNIER
BY *Hammond and Littell*
ATTORNEYS United States Patent Office 3,230,336
Patented Jan. 18, 1966

3,230,336
METHOD AND APPARATUS FOR THE CONTINUOUS MANUFACTURE OF WELDED METAL TUBES
Guy Jean Pierre Gueugnier, Paris, France, assignor, by mesne assignments, to Friedrich Kocks Firma, Dusseldorf, Germany
Filed June 4, 1963, Ser. No. 285,335
Claims priority, application France, June 4, 1962, 899,663, 899,665
8 Claims. (Cl. 219—8.5)

Welded metal tubes, and especially steel tubes, are generally roughed-out by a machine which comprises rollers for cold-forming the band of strip metal constituting the raw material, and an electric welding station, followed by a cutting-off machine. The roughed-out tubes thus obtained, generally of considerable lengths, are then heated by passage through a furnace before being passed into a reducing rolling-mill which enables their dimensions to be adjusted in diameter and, when so required, in thickness.

The arrangement directly at the outlet of the welding machine, of a usual type of furnace through which the tube would pass continuously in the longitudinal direction before being passed to the reducing rolling-mill, would correspond to an installation of great length which would therefore be costly to construct and to maintain. Its reliability of operation would furthermore be uncertain.

The usual types of welding machine generally utilize electrodes which introduce certain irregularities of welding due to the contact necessary for leading-in the current; they would thus be difficult to incorporate in a more complex unit which it would be necessary to stop in the event of any incident in the welding machine.

On the other hand, the usual kinds of furnace are generally heated by combustion of a gaseous or liquid fuel, and they contain a large portion of the tube. In a continuous manufacturing process in which the tube is necessarily kept under tension between the rolling-mill and the welding machine, the fact of bringing a substantial length of the tube up to a fairly high temperature in order that the metal may reach the plastic state would necessarily involve large and uncontrollable deformation of the said tube which could even result in its fracture.

For these main reasons and some others, there do not appear to exist installations such as described above, and the only known installation for the manufacture of welded tubes operating in a continuous process from the metal strip to the calibrated tube, proceed by heating the metal strip in a furnace immediately followed by a forming operation, welding of the edges and passing to the reducing rolling-mill. These operations are practically simultaneous and are bound-up with each other; they are all carried out in the hot state.

The present invention relates to a method of continuous manufacture of welded metal tubes and the corresponding installation, which enables the capital outlay to be reduced since the chain of manufacture is short and is composed for the greater part of usual equipment, at the same time ensuring a large production of very uniform quality.

The invention consists essentially in subjecting a band of metallic strip to the successive operations of: a forming stage; welding by bringing together the edges of the strip suitably heated by induction; electric heating of the whole of the tube by the Joule effect, directly generated in the tube thus formed; and finally calibration of the tube in the hot state, the whole in a continuous manner and in a very short space.

The machines utilized and arranged following each other according to the invention are for the greater part of standard types; they will be described below in a manner sufficient to describe the invention but are combined with an electric heating device employing the Joule effect inside the metal of the tube, comprising at least one electric generator and means for leading-in the current. The device for heating by the Joule effect may furthermore be advantageously of the type described in the patent application of even date for "A Device for Heating a Product in Continuous Movement, Such as a Tube or Wire," United States patent application Serial No. 285,343.

The advantages which may be derived from the combination of welding by induction and electric heating, such as referred to above, may be still further reinforced according to another particular feature of the present invention.

In fact, the heating of the tubes before calibration in the hot state is usually effected in a manner independent of the reducing rolling-mill generally employed. The reductions in the diameter of the tube and, when so required, in its thickness, are associated with a longitudinal tractive pull applied to the said tube between the series of rollers which constitute the successive passes of the rolling-mill, which is for that reason known as a drawing rolling-mill. This type of machine is complicated and very costly.

Due to the fact that it is easily possible to interpose a leading-in device for electric current between the forming and welding machine on the one hand and the calibrating rolling-mill on the other, the heating can be carried out on a tube, utilizing the Joule effect, during the course of a continuous manufacturing process. From this it results that the tooling can be simplified without reducing the quality of the products.

A particular feature of the invention thus consists of regulating the thickness of a welded metal tube manufactured on a complete continuous chain, by controlling the deformation of this tube by traction, in its hot zone, between its forming before welding and its calibration proper, carried out at a speed greater than the forming speed.

This method can readily be carried into effect by providing an installation in conformity with that which has been indicated above, with means for the differential regulation of the speed of the motors respectively driving the forming rollers and the calibrating rollers. These means, which may be of the usual kind, will preferably be controlled in dependence on a measurement of the thickness of the strip metal used as raw material. As an alternative, the thickness of the rough tube which has just been welded could also be detected and action could be taken on the heating temperature of the metal rather than on the stress to which the metal is subjected.

The description which follows below with reference to the accompanying drawings, which are especially given by way of example, will make it quite clear how the invention can be carried into effect in practice.

In these drawings:

FIG. 1 is a layout diagram of a continuous production line for tubes according to the invention; FIG. 2 represents in diagrammatic form a complete installation for the continuous manufacture of welded tubes, similar to that of FIG. 1, but provided with means for regulating the thickness of the tubes.

At the input of a manufacturing line such as that shown in FIG. 1, there is located an unwinding station 1 for the sheet metal in strip 12, behind which is provided a forming unit 2 and a welding unit 4 for the tube.

While the forming device 3 may be of any usual kind, the welding station 4 according to the invention is in any case of the induction heating type, preferably working at radio frequencies (higher than 400 kilocycles). It is not however excluded that the so-called medium frequencies (1 to 10 kc.) may also be employed. The welding station comprises an alternating current generator 5 of high frequency and at least one inductor 6, provided when so required with a magnetic core. A turn surrounding the tube and welding or pressure rollers have been shown by way of example.

On the downstream side of the forming and welding device on the path of the tubes is located a device 7 for electric heating using the Joule effect. There has been shown diagrammatically a heating device supplied with three-phase alternating current and in which the leading-in of the current is effected at least in part by rollers 8 rolling over the tube. A device of this kind, to which it seems more particularly necessary to give preference, is described in the patent application filed as of even date by the present applicant for "A Device for Heating a Product in Continuous Movement, Such as a Tube or Wire," S.N. 285,343. As an alternative, it is possible to conceive numerous other devices bearing on the current itself, which may be direct current or alternating current at any appropriate frequency, but also on the leading-in device for the current, which may employ brushes or sliding contacts, rollers or the like, and finally inductors which create induced longitudinal and/or transverse currents within the thickness of the tube. It is furthermore obvious that it is sought to obtain a uniform heating of the tube, independently of the conduction of heat in the thickness of the metal. By way of example, there may be envisaged a symmetrical arrangement of the current leading-in means. The said means, in the present case the rollers 8, may also be alternately disposed in the longitudinal direction.

At its outlet from the electrical heating device 7, the tube passes directly into a calibrating rolling-mill 9 with multiple rollers 10, of any known kind. Finally, a saw or shearing machine 11 enables the tube 13 to be cut-off as it is manufactured in a continuous manner.

It can be seen from this description of the installation that the method which constitutes the essential feature of the invention is characterized by the succession of a conventional forming operation, an induction welding stage, a heating of the tube by the Joule effect, and a calibration while hot. The relatively small amount of capital outlay necessitated by such a complete installation with a modest longitudinal development, the ease with which it is regulated, and finally the great reliability of operation and the low maintenance involved on the one hand by the welding of the tube without contact and its heating by the Joule effect on the other, are advantages of sufficient importance to compensate for the high cost of the electric current, which is furthermore utilized with excellent efficiency. The replacement of this latter by the usual type of furnace would immediately increase the length and the cost of the installation, the regulation of which would furthermore be made more difficult by reason of the deformation of the tube, held under tensile stress.

In the form of embodiment shown in FIG. 2, the elements similar to those of the installation shown in FIG. 1 have been given the same reference numbers. It has furthermore being defined that at least one electric motor 14 drives the pairs of rollers 3 which act in succession for the forming of the tube. In the same way, the rollers 10 of the calibrating rolling-mill 9 are driven by at least one electric motor 15.

The motors 14 and 15 are respectively provided with detectors 16 and 17 for the speed of rotation of their rotating parts, the signals thus emitted being respectively proportional to the linear speeds of the tube in two transverse planes of reference attached respectively to the forming machine on the one hand and to the calibration rolling-mill on the other.

An apparatus 18 of any kind, of known type if desired, serves to measure the thickness of the strip metal 12. By way of example, this apparatus may be a mechanical gauge or a pneumatic comparator. It is connected, together with the devices 16 and 17, to an electric distribution station 19 supplied from the grid system and coupled at least to the motor 15 but eventually also to the motor 14 (as shown in the figure) and to the heating device 7.

It is understood that the present description has been deliberately simplified, the fine and continuous regulating devices for the relative speed of two electric motors being known per se. It is for example possible to employ at least one Ward-Leonard set and an appropriate correspondence control. The result obtained by the combination of a device of this kind with a continuous manufacturing line for tubes in accordance with that which has been described in connection with FIG. 1, is however remarkable.

In fact, by giving the motor 15 a slight overspeed relative to the motor 14, it is thus possible to reduce the thickness of the tube 13 by elongation of its heated portion by means of the device 7, and even to ensure an actual regulation of the said thickness. Contrary to what takes place generally, the drawing takes place outside the calibration rolling-mill 9, between this latter and the forming and welding machine 2, in fact in the hottest zone of the tube. The rolling-mill may therefore be of a particularly simple type without reducing in consequence the possibilities of the installation.

In this way, it is possible to obtain for the finished tubes tolerances of thickness and metric weight which are reduced to only a small percentage, which is particularly economic.

It will of course be understood that certain alternative forms are possible. For example, the thickness of the roughed-out tube can be measured at the outlet of the forming and welding machine, at 20. It is also possible to utilize machines, each of which has several motors together with two inter-connected control stations, one per motor, instead of a central electric station such as 19. In addition, action may be taken on the deformation of the tube passing through the heating device 7 by controlling the intensity of its heating current rather than the tractive pull. The detectors 16 and 17 of the speed could also be replaced by a device which measures the torque of the electric motor 15.

Finally, the invention is understood to cover the forms of construction which utilize technical means equivalent to those which have just been described. Thus, for example, the electric drives could be replaced by hydraulic drives having the same functions as those described.

What I claim is:

1. A method of continuous manufacture of welded metal tubes from cold sheet metal in strips which comprises the steps of
    (a) shaping sheet metal in cold strips into the form of an open tube;
    (b) welding said cold open tube by bringing together the edges of said sheet metal in strips and heating said edges by induction;
    (c) uniformly heating said welded tube by the Joule effect generated directly in said tube;
    (d) calibrating said uniformly heated welded tube; and
    (e) cutting said calibrated tube into the desired lengths.

2. A method as claimed in claim 1, in which the thickness of said tube is regulated by effecting said calibration at a speed higher than the forming speed, thereby causing a deformation by tensile stress of said tube in its heating zone.

3. An installation for the continuous manufacture of welded metal tubes starting from cold sheet metal strips, said installation comprising, in combination and in the stated order, a feeding device for feeding said cold sheet metal in strips, a forming device with rollers to form said metal tube from said cold sheet metal in strips, a welding device comprising at least one induction coil around said cold formed tube and pressure welding rollers serving for welding said tube, and means for supplying said coil with alternating current at appropriate frequency, an electric heating device combining means for connecting the wall of said tube, serving as a resistance, to an appropriate electric supply, and finally a calibration rolling mill followed by a cutting-off device.

4. An installation for the continuous manufacture of welded metal tubes starting from sheet metal in strips, said installation comprising, in combination and in the stated order, a feeding device for feeding said sheet metal in strips, a forming device with rollers to form said metal tube from said sheet metal in strips, a welding device comprising at least one induction coil around said formed tube and pressure welding rollers serving for welding said tube, means for supplying said coil with alternating current at appropriate frequency, at least one first electric motor device for driving said forming and welding rollers, an electric heating device combining means for connecting the wall of said tube, serving as a resistance, to an appropriate electric supply, a calibration rolling-mill, at least one second electric motor device for driving said calibration rolling-mill, means for measuring the thickness of said metal strip and for measuring the tractive pull applied to said tube between said calibration rolling-mill and said forming device with rollers, said measuring means acting on at least one of the electric supply means for said second motor and the electric supply for said heating device, in order to control the deformation of said tube at its hottest zone and thereby its final thickness, and a cutting-off device.

5. An installation as claimed in claim 4, in which said second electric motor device driving said calibration rolling-mill comprises an electrical speed vibration device such as a Ward-Leonard unit.

6. An installation as claimed in claim 4, in which said thickness-measuring means are disposed on the upstream side of said forming device.

7. An installation as claimed in claim 4, in which said means for measuring the tractive pull on said tube are detector means of the speed of rotation of said first and second electric motor devices respectively driving said rollers in said forming device and said calibration rolling-mill.

8. An installation as claimed in claim 4, in which the tractive pull on said tube is measured by means of a torque-meter provided on said second electric motor device driving said calibration rolling-mill.

References Cited by the Examiner
UNITED STATES PATENTS

| | | | |
|---|---|---|---|
| 2,024,485 | 12/1935 | Sussman | 29—33.4 |
| 3,037,105 | 5/1962 | Kohler | 219—8.5 |

RICHARD M. WOOD, *Primary Examiner.*